United States Patent [19]

Jain

[11] Patent Number: 4,839,222

[45] Date of Patent: Jun. 13, 1989

[54] FIBERGLASS INSULATION COATED WITH A HEAT COLLAPSIBLE FOAM COMPOSITION

[75] Inventor: Surendra Jain, Easley, S.C.

[73] Assignee: The Reynolds Company, Greenville, S.C.

[21] Appl. No.: 173,418

[22] Filed: Mar. 25, 1988

[51] Int. Cl.$^4$ .................. B32B 3/26; B32B 17/10; B32B 5/20

[52] U.S. Cl. .................. 428/290; 428/304.4; 428/441; 428/920; 428/921; 521/70

[58] Field of Search ............ 428/96, 150, 290, 304.4, 428/311.5, 316.6, 441, 920, 921; 521/70

[56] References Cited

U.S. PATENT DOCUMENTS 4,326,904  4/1982  Eckert et al. .................. 428/290

Primary Examiner—William J. Van Balen
Attorney, Agent, or Firm—Martin K. Lindemann

[57] ABSTRACT

An improved heat collapsible foam coating is provided for fiberglass insulation articles which is coated onto the fiberglass insulation, thereby providing the fiberglass insulation with good mechanical properties and other desirable properties such as low emission of volatiles, fire retardency, low potential smoke generation and low air friction.

15 Claims, No Drawings

FIBERGLASS INSULATION COATED WITH A HEAT COLLAPSIBLE FOAM COMPOSITION

FIELD OF THE INVENTION

This invention relates to collapsible foam coatings for fiberglass insulation articles which are coated onto the fiberglass insulation, thereby providing the fiberglass insulation with good mechanical properties and other desirable properties such as low emission of volatiles, fire retardation, low potential smoke generation and low air friction.

BACKGROUND OF THE INVENTION

Fibrous batts, mats or boards are used to thermally insulate various surfaces, such as the inside or outside of pipes and ducts, as well as refrigerators, air conditioners, furnaces, automobile hoods and the like. Heating, cooling or ventilating systems usually use air ducts, through which flows air as the heating and cooling medium. These ducts are constructed in various shapes, for example as round tubes or having a rectangular shape. They are usually made of sheet metals, such as galvanized steel, or plastics, or fiberglass reinforced plastics, or cellulosic materials such as wood or fiberboard, and the like. The construction and method of making these ducts and conduits is described in U.S. Pat. Nos. 3,092,529; 3,212,529; and 3,394,737. The inside of these ducts is usually black so as not to see the duct through the vents. The innner surface of these ducts should be smooth, to allow the air to flow with as little friction as possible, to save energy in transporting the air. This is usually achieved by first coating the fiberglass insulation which is then installed in the air ducts. The coating of the fiberglass insulation normally does not interfere with the excellent noise dampening qualities of the fiberglass insulation. The duct noise is often generated by the fan and by the flowing air, or, in the case of refrigerators, automobiles, furnaces and the like, by the engines and motors. Generally, the fiberglass mats, or batts are coated with an aqueous coating composition, often after the surface of the fiberglass mat has first been covered with a woven or nonwoven fabric.

Conventionally, the coatings are applied by spraying the coating composition onto the surface of the fiberglass batting. The coating is then dried in heated ovens, or by radiant heat. These procedures are generally carried out continuously. The finished fiberglass batting is then pulled up and often compressed by applying vacuum before shipping in order to save on shipping costs.

One such coating composition is disclosed in U.S. Pat. No. 3,926,894. The coating composition of U.S. Pat. No. 3,926,894 consists of a halogenated organo-phosphorous plasticizer, a latex binder and a mineral filler. However, a serious disadvantage of such a coating composition is the relative volatility of the plasticizer, especially in air ducts where large volumes of heated air pass over the coating, which makes the coating environmentally undesirable because the vapors emanating from the plasticizers are quite toxic.

Accordingly, it is an object of this invention to provide a coating having good mechanical properties, low volatility of the ingredients, fire retardation, as well as low black smoke generation. Furthermore, it is an object of this invention to apply the coating more efficiently to the fiberglass insulation by whipping air into the coating composition and applying the coating as a heat collapsible foam by roller or knife coating.

SUMMARY OF THE INVENTION

The present invention is based on the finding that by providing a heat collapsible foam as a fiberglass insulation coating containing two or more polymers as the binders and other optional ingredients dispersed in water and by applying this foam coating composition by roller or knife coating methods, one obtains a coated fiberglass insulation such as fiberglass mats, boards, and batts, or the like, having superior mechanical properties as well as fire retardation, low black smoke generation, and low friction to passing air. Thus, an aqueous, foamable coating composition is provided for use on fiberglass insulation articles comprising an aqueous medium having dispersed therein solid material consisting essentially, by weight, of (a) 6 to 26 percent, preferably 12 to 20 percent, of a strong and soft, non-halogenated, vinyl type polymer;

(b) 6 to 26 percent, preferably 12 to 20 percent, of a halogenated vinyl polymer;

(c) 40 to 80 percent, preferably 50 to 70 percent, of at least one inorganic filler, selected from the group of clay, calcium carbonate, aluminum trihydrate, magnesium trihydrate, antimony oxide, barium sulfate and encapsulated asbestos, or a mixture thereof;

(d) 0.1 to 1 percent of a foaming agent; and (e) 0.2 to 2 percent of a thickening agent.

DETAILED DESCRIPTION

An improved coating composition for fiberglass articles comprising an aqueous dispersion containing at least two polymeric binders, aluminum trihydrate, antimony oxide, as well as foaming agents, biocides, thickeners, color pigments, dispersants and the like, has now been discovered. It has been discovered that the improved coating composition for fiberglass articles of this invention may be applied as a heat collapsible foam and then collapsing the foam coating in a drying oven. The dried coating of this invention has been found to impart an exceptionally advantageous balance of properties to the fiberglass insulation which cannot be achieved by heretofore known coating compositions and methods of applying the same.

The foamable coating composition of the present invention is prepared by first dispersing aluminum trihydrate, antimony oxide, and a colored pigment in water using a Cowles type mixer, a sand mill, a three roll mill, or a similar high energy mixing device, and then blending this pigment slip with a mixture containing two emulsion polymers, a surfactant, or a blend of surfactants, a thickener and a biocide.

The properties of the fiberglass insulation coating which have to be balanced against each other are: mechanical strength combined with elasticity, fire retardation, and the lack of black smoke generation when a flame is brought in contact with the coating, as well as the smoothness of the insulation surface, as not to impede the airflow through ducts.

Fire retardation of a coating generally is achieved by using in the coating composition a halogenated organo-phosphorous plasticizer as taught in U.S. Pat. No. 3,926,894, together with a polymeric binder and a filler or pigment. However, a serious disadvantage of such a coating is the relative volatility of the plasticizer, especially in air ducts where large volumes of heated air pass over the coating, which makes the coating environmentally undesirable. A plasticizer also contributes greatly to black smoke generation, when a flame comes in contact with the coating.

On the other hand, a flexibilizing agent is necessary in the coating, because the coating has to have enough elasticity to allow the coated fiberglass insulation to be installed inside of rectangularly shaped ducts or other odd shaped bodies as well as in flexible type ducts, and the fiberglass insulation coating has to survive the installation process, as well as later use, without cracking or flaking-off.

Generally, aluminum trihydrate and antimony oxide or a mixture thereof may be used to inhibit said black smoke generation. However, these pigments contribute to making the coating stiff so that a coated fiberglass insulation tends to embrittle, leading to cracks in the coating and even to flaking-off of the coating during the installation process and later use. Formerly, a plasticizer was added to the coating composition, but for the above cited reasons, namely toxicity, this is undesirable.

It has now been found that all these above mentioned disadvantages of the coating can be overcome without loosing the other desirable properties. This is achieved by the surprizing discovery that when two polymer emulsions, one containing a halogenated polymer, the other containing a soft and strong, non-halogenated vinyl polymer, are used as the binder in the coating, one can achieve the necessary balance of properties to produce a superior fiberglass insulation product making it unnecessary to use a plasticizer in the coating formulation, thereby eliminating the environmental hazard. Since one of the polymeric binders is halogenated, one has to use only small amounts of fire retardant fillers thereby limiting the embrittling effect of fillers. The binder is a very important part of the coating composition, since it bonds the fillers and pigments securely to the fiberglass insulation, thereby achieving the above mentioned smooth surface of the fiberglass insulation.

It has now been discovered that when a strong and soft vinyl polymer is used together with a halogenated polymer, and with moderate amounts of fillers, such as a mixture of aluminum trihydrate and antimony oxide, one can achieve a coating which is not only mechanically strong but also elastic, without decreasing the fire retardation of the coating. The coating of this invention also generates almost no black smoke when brought in contact with a hot flame, as well as having a low emission of volatile materials when having contact with flowing air, as is the case in heating, cooling and ventilating ducts.

The coating solids of this invention consist essentially of, by weight, (a) 6 to 26 percent, preferably 12 to 20 percent, of a strong and soft, non-halogenated, vinyl type polymer;

(b) 6 to 26 percent, preferably 12 to 20 percent, of a halogenated vinyl polymer;

(c) 40 to 80 percent, preferably 50 to 70 percent, of at least one inorganic fillers, selected from the group of clays, calcium carbonate, aluminum trihydrate, magnesium trihydrate, antimony oxide, barium sulfate and encapsulated asbestos, or a mixture thereof; and (d) 2 to 10 percent, preferably 3 to 8 percent, of additional ingredients consisting of foaming agents, organic pigments, dispersants, biocides and a thickener, and the like.

The strong and soft, non-halogenated, vinyl type polymer of this invention is usually an acrylic polymer, a vinyl-acrylic polymer, a vinyl-olefin polymer or a styrene-butadiene polymer, dispersed in water, having a solids content from 30 to 60 percent, preferably from 40 to 55 percent by weight, having a glass transition temperature from $-40°$ to $+20°$ C., preferably from $-30°$ to $0°$ C., an intrinsic viscosity from 1 to 3.5 deciliters per gram, and a Shore hardness of 20 to 60 as measured with a Durometer A. The measurement of the glass transition temperature is described in the book, "Principles of Polymer Chemistry", by Paul Flory, pp. 56 and 57, Cornell University Press (1953). The intrinsic viscosity is determined by conventional techniques, i.e. in accordance with the procedure described on pages 309–314 of the book "Principles of Polymer Chemistry" by Paul Flory (Cornell University Press, 1953).

When properly cured a 10 mil film of the non-halogenated polymer has a tensile strength of from 500 to 1500 psi, preferably from 700 to 1000 psi and an elongation at break of from 500 to 1500 percent, preferably from 700 to 1200 percent as measured with an Instron tensile tester. The acrylic polymers are well known in the art and many consist, for example, of a homo- or copolymer of methyl acrylate, ethyl acrylate, isopropyl acrylate, butyl acrylate, 2-ethyl hexyl acrylate, and a n-alkyl methacrylate, such as methyl methacrylate; also present may be acrylonitrile or styrene. Small amounts of functional monomers to effect cross-linking, for example, acrylic acid and N-methylol acrylamide or the like, are also often present. The vinyl-acrylic polymer is often a copolymer of the above mentioned acrylic- and methacrylic ester with a vinyl ester, such as vinyl acetate or vinyl propionate. An example of a vinyl-olefin polymer is a vinyl acetate-ethylene copolymer. Polymer dispersions or emulsions of this kind are available in commerce under the tradenames Rhoplex (Rohm and Haas Co.), Airflex (Air Products and Chemical Co.), Elastoplast (B. F. Goodrich Co.), and Dow Latex (Dow Chemical Co)

The halogenated polymers of this invention are often copolymers of acrylic esters, vinyl esters, ethylene and butadiene, alone or in combination, with halogenated monomers, such as vinyl chloride, vinylidene chloride, chloroprene; also with vinyl bromide; 2,3-dichloro-1,3-butadiene, halogenated vinyl esters, such as chlorovinyl acetate, halogenated acrylic esters such as chloroethyl acrylate and the like. Homopolymers of chloroprene, vinylchloride and vinylidene chloride may also be used. Especially prefered halogenated polymers or copolymers are chloroprene polymers, sold under the tradename Neoprene (DuPont Co.), vinyl chloride-ethylene copolymers sold under the tradename Airflex (Air Products and Chemicals Co.) and vinylidene chloride homopolymers or copolymers, sold under the tradenames of Daran (W. R. Grace Co) or RAP (Dow Chemical Co.). These polymers are in commerce as dispersions in water, having a solids content of from 40 to 60 percent, and having a glass transition temperature from $-20°$ to $+100°$ C., preferably from $0°$ to $30°$ C. and having a chlorine content by weight of from 20 to 75 percent, preferably from 30 to 60 percent.

The fillers employed in this invention are naturally occurring materials such as clays, calcium carbonate, aluminum trihydrate, magnesium trihydrate, antimony oxide, barium sulfate, as well as encapsulated asbestos. Especially prefered are aluminum trihydrate and antimony oxide and mixtures thereof. They are employed in the amount, by weight of the dry coating, of from 40 to 90 percent, preferably from 50 to 70 percent.

Each of the above polymers and fillers may be employed individually, or in combination within the stated proportions to produce the coatings of this invention possessing comparable properties.

In addition to the above mentioned components of the coating composition of this invention, other additives may be employed as required. Among those other additives are foaming agents, such as nonionic surfactants, for example alkylphenoxypolyethoxyethanol, having alkyl groups of about 7 to 18 carbon atoms and 10 to 60 or more oxyethylene units, and the like, and anionic surfactants such as sodium lauryl sulfate and sulfosuccinates, alkyl phosphates and the like. They are employed in the amount, by weight of the dry coating, of from 0.02 to 2 percent, preferably from 0.1 to 1 percent.

The coating composition of this invention also contains a thickener, usually a carboxylated arcylic polymer, polyvinyl alcohol, or hydroxyethyl cellulose. Thickeners are employed in the amount of from 0.2 to 2 percent by weight of the dry coating, to impart a viscosity to the coating composition of from 300 to 2000 cps as measured with a Brookfield viscometer. Optionally a biocide is added to the coating composition in the amount of 0.5 to 1.2 percent by weight of the dry coating. A suitable biocide is diiodo methyl-p-tolyl sulfone, sold under the tradename Tektamer 38 by the Calgon Div. of Merk and Co. Other compatible biocides may also be used.

The color pigments employed in this invention may be carbon black or other organic color pigments. Carbon black is prefered. It is used in the amount of 0.5 to 5 percent, preferably from 1 to 3 percent by weight of the dry coating. Often a dispersant is also added to the coating formulation to aid in the dispersion of the pigments and fillers. A suitable dispersant is Seycosperse 4, sold by the Cargil Manufacturing Co. It is used in the amount of 0.01 to 0.15 percent preferably from 0.05 to 0.1 percent by weight of the dry coating. Other compatible dispersant may also be used.

The coating composition of this invention has a solids content from 30 to 75 percent, preferably from 35 to 65 percent.

Generally, fiberglass coatings of the prior art are applied by spraying the coating composition onto the surface of the fiberglass batting. However, the foamable coating composition of this invention is preferably applied by roller or knife coating methods. These coating methods are well known in the art. They are described in detail in the Encyclopedia of Chemical Technology, Third Edition, Volume 6, pp. 386-426, published by John Wiley, New York, 1979. It is a special advantage of the foamable coating composition of this invention that it does not have to be sprayed onto the fiberglass batting as is the case with nonfoamable coating compositions. In fact, spraying any aqueous coating composition has a number of disadvantages. For example, when spraying a coating composition one wastes at least 10 to 35 percent of the coating by mist formation which is also a health hazard. The mist is often drawn into the drying oven, where it deposits on the drying equipment and creates a fire hazard. The ovens also have to be cleaned often, and disposal of the dried coating material poses an environmental problem. After the spray nozzles clog which leads to expensive machine downtime. Also, the nonfoamable coatings of the prior art cannot easily be applied by roller or knife coating methods, since the viscosity of the coatings cannot be very high because excessive amounts of thickener are needed in that case and they are undesirable in a coating composition, because they contribute to cracking of the dried coating. Therefore, the coatings of the prior art, being of low viscosity by necessity, will penetrate too deeply into the fiberglass, thereby wasting value coating.

It is the purpose of this invention to overcome all the above mentioned disadvantages. To this end, a heat colllapsible foam coating composition is provided to be applied by knife or roller coating methods. By whipping air into the aqueous coating composition of this invention a high viscosity foam is provided having an increased volume of about 1 to 3 times the original volume of the liquid coating composition. The foam contains about 1 to 20 parts, preferably 1 to 10 parts of whipped gas (usually air) by volume per part of the liquid coating composition. Often, a 1 to 1 ratio by volume of the liquid coating composition to air is used. Generally, any method well known in the art which produces a foam may be used; mechanical foam machines made by Oakes Co., Ease Co. or Less Co. may be employed. Machines using a static mixing device are also often useful to whip air into the coating composition of this invention.

Usually, only enough foam is applied to the fiberglass insulation by knife or roller coating methods to provide a continuous coating layer to the fiberglass insulation after the drying step. Generally, the add-on of the wet foam to the fiberglass insulation is controlled in such a way as to provide a dry coating weight of about 5 to 15 grams per square foot of fiberglass batting, preferably 7 to 10 grams per square foot of the finished fiberglass insulation.

The foam coated fiberglass insulation is then passed through a drying oven, where the heat collapsible foam dries to a smooth coating. Drying is normally carried out at temperatures of from 220° F. to 500° F. for periods from 30 seconds to 20 minutes, but more usually at 300° F. to 350° F. for from 30 seconds to 10 minutes.

The invention is illustrated in the following examples. It should be understood, however, that the examples are for illustrative purposes only and in no way should they be construed to be limiting the invention.

EXAMPLE 1

A dispersion of pigments and fillers is prepared first as follows: to 155.3 g of water is added 0.5 grams of a 40 percent solution in water of a polyacrylate dispersant (Seycosperse 4, made by the Cargil Corp. may be used), 150 grams of aluminum trihydrate, 5 grams of antimony oxide, and 11.3 grams of a 40% dispersion in water of carbon black. The mixture is agitated for 10 minutes with a Cowles type high energy agitator, after which the following is added with reduced agitation: 100 grams of Elastoplast V-29, a non-halogenated acrylic polymer emulsion sold by the B. F. Goodrich Co, having the following properties: solids=52%; pH=5; glass transition temperature=−29° C.; Durometer A hardness=49; ultimate tensile strength (10 mil film, heated to 300° F.)=813 psi; elongation=760%; 100 g of Airflex 4514, a vinylchloride-ethylene copolymer emulsion sold by Air Products and Chemical Corporation, having the following properties: solids=50%; pH=7; chlorine content by weight=42.5%; glass transition temperature=14° C.; 1.1 grams of Seycopon G 96, a brand of sodium lauryl sulfate as a 28 percent solution in water, made by the Cargil Corporation; 0.5 grams of Tektamer 38, a biocide having as primary ingredient diiodo methyl-p-tolyl sulfone, sold by the Calgon Div. of Merk and Co.; 8.1 grams Paragum 500, a 30 percent solution in water of a polyacrylate thickener made by the Parachem Co.; and 2 grams of a 28 percent solution of ammonium hydroxide. The finished coating composition had a viscosity of 870 cps (measured with a Brookfield viscometer, #2 spindle at 20 RPM), a pH of 8.87, and a solids content of 50 percent. A 10 mil thick dry film was prepared from this coating composition to test the mechanical properties as follows: The film was folded in half making a sharp crease. The folded film was then placed beetwen two plates and an eight pound weight was placed on the plate for 2 hours to make the crease of the film even sharper. After that time the film was unfolded, inspected for breakage at the crease and lightly stretched. The film did not break either by creasing it or by lightly stretching it, indicating that the coating film had excellent mechanical properties.

EXAMPLE 2

The coating composition of Example 1 was whipped with air using a Hobart Laboratory Mixer (Model N-50) equipped with a wire whip mixer to obtain a foam having a liquid to air ratio by volume of 1 to 10. Several pieces of fiberglass insulation, weighing 53 grams per square foot and having the dimensions of $8 \times 9 \times \frac{3}{4}$ inches each, were roller coated with the foam, using a metal roller, to give a dry add-on of coating of 8 grams per square foot of fiberglass insulation. The coated pieces of fiberglass insulation were then dried in an oven at 325° F. for 5 minutes, after which the foam coating on each piece had collapsed and was transformed into a smooth strongly adherent coating. The coated fiberglass insulation pieces were then subjected to the following tests:

Flammability Test

A $1\frac{1}{2} \times 8$ strip of a coated fiberglass insulation piece was positioned next to a propane torch having a 2 inches long blue inner flame in such a way, that the tip of the blue inner flame touched the surface of the test piece at a 30 degree angle. After a 60 second exposure to the flame, the test piece was removed. The test piece did not glow or burn (also called having no "afterflame") and it gave off no visible black smoke.

Heat Resistance

A test piece was placed in a 250° F. oven for 10 days, after which the piece was examined for elasticity, by flexing the piece. No breaking, cracking or flaking-off of the coating was observed.

COMPARATIVE EXAMPLE 1

A coating composition was prepared following the procedure and using the ingredients of Example 1, with the exception that the halogenated vinyl polymer, namely Airflex 4514, was replaced by Chlorowax 57-60, a low molecular weight chlorinated wax sold by the Diamond Shamrock Co, having a chlorine content of 57 percent. Coated test pieces of fiberglass insulation were prepared according to Example 2. The Flammability Test was not passed by the test piece. There was considerable "Afterflame" present when the testflame had been removed. After exposure to heat in the Heat Resistance Test the test piece showed poor adhesion of the coating to the fiberglass insulation, as well as cracking and flaking-off of the coating.

A test film prepared and creased according to Example 1 showed poor crease resistance as well as breakage when lightly stretched, indicating poor mechanical properties.

COMPARATIVE EXAMPLE 2

A coating composition was prepared using the method and ingredients of Example 1, with the exception that Elastoplast V29 was replaced by another non-halogenated acrylic emulsion, namely Rhoplex HA-8, sold by the Rohm and Haas Co., consisting of an ethyl acrylate polymer having a glass transition temperature of −20° C., and an ultimate tensile strength of 350 psi, and an elongation of 450% (10 mil film, heated to 300° F.). This coating showed poor mechanical properties in the folded Film Test performed according to the method of Example 1.

These examples and comparative examples show that the aqueous coating compositions produced using the instant invention are by far superior to the comparative coating compositions, which are used in commerce containing either a weaker acrylic polymer as in comparative example 2, or a halogenated non polymeric material as in comparative example 1.

That which is claimed is:

1. An aqueous, foamable coating composition for use on fiberglass insulation articles comprising an aqueous medium having dispersed therein solid material consisting essentially, by weight, of
    (a) 6 to 26 percent of a strong and soft, non-halogenated, vinyl type polymer;
    (b) 6 to 26 percent of a halogenated vinyl polymer;
    (c) 40 to 80 percent of at least one inorganic filler selected from the group of clay, calcium carbonate, aluminum trihydrate, magnesium trihydrate, antimony oxide, barium sulfate and encapsulated asbestos, or a mixture thereof;
    (d) 0.1 to 1 percent of a foaming agent; and
    (e) 0.2 to 2 percent of a thickening agent.

2. An aqueous, foamable coating composition according to claim 1 wherein said strong and soft, non-halogenated, vinyl type polymer consists essentially of a polymer selected from the group of acrylic polymer, vinyl-acrylic copolymer, styrene-butadiene copolymer, styrene-acrylonitrile-butadiene copolymer or vinyl ester-ethylene copolymer having a glass transition temperature of from −40° to +20° C., a tensile strength of a 10 mil film of from 500 to 1500 psi and an intrinsic viscosity of from 1 to 3.5 deciliters per gram.

3. An aqueous, foamable coating composition according to claim 1 wherein the halogen portion of said halogenated vinyl polymer is chlorine or bromine.

4. An aqueous, foamable coating composition according to claim 1 wherein said halogenated vinyl polymer is selected from the group of polychloroprene, polyvinyl chloride, polyvinylidene chloride, chloroprene copolymer, vinyl chloride-ethylene copolymer, acrylate ester-vinylidene chloride copolymer, acrylate ester-vinyl chloride copolymer, or butadiene-vinylidene chloride copolymer having a chlorine content of 20 to 72 percent by weight.

5. An aqueous, foamable coating composition according to claim 2 wherein the acrylic portion of said strong and soft, non-halogenated, vinyl type polymer contains a monomer selected from the group of acrylic acid, methacrylic acid, esters of acrylic acid, esters of methacrylic acid, styrene or acrylonitrile.

6. An aqueous, foamable coating composition according to claim 4 wherein the vinyl portion of said strong and soft, non-halogenated, vinyl type polymer contains a monomer selected from the group of vinyl acetate, vinyl propionate or ethylene.

7. An aqueous, foamable coating composition according to claim 1 wherein said strong and soft, non-halogenated, vinyl type polymer is a copolymer of ethyl acrylate and acrylonitrile.

8. An aqueous, foamable coating composition according to claim 1 wherein said strong and soft, non-halogenated, vinyl type polymer is a copolymer of butyl acrylate and acrylonitrile.

9. An aqueous, foamable coating composition according to claim 1 wherein said strong and soft, non-halogenated, vinyl type polymer also contains N-methylol acrylamide.

10. An aqueous, foamable coating composition according to claim 1 wherein said inorganic filler consists of aluminum trihydrate or antimony oxide, or a mixture thereof.

11. An aqueous, foamable coating composition according to claim 1 containing from 30-75 percent solids and having a viscosity of 600 to 1700 centipoises.

12. An aqueous, foamable coating composition according to claim 1 wherein said foaming agent is sodium lauryl sulfate.

13. An aqueous, foamable coating composition according to claim 1 wherein said thickening agent is selected from the group consisting of a copolymer of ethyl acrylate and methacrylic acid or acrylic acid, polyvinyl alcohol or hydroxyethyl cellulose, or mixtures thereof.

14. A fiberglass insulation article covered with an aqueous, foamable coating composition, said aqueous, foamable coating composition comprising an aqueous medium having dispersed therein solid material consisting essentially, by weight, of
(a) 6 to 26 percent of a strong and soft, non-halogenated, vinyl type polymer;
(b) 6 to 26 percent of a halogenated vinyl polymer;
(c) 40 to 80 percent of at least one inorganic filler, selected from the group of clay, calcium carbonate, aluminum trihydrate, magnesium trihydrate, antimony oxide, barium sulfate and encapsulated asbestos, or a mixture thereof;
(d) 0.1 to 1 percent of a foaming agent; and
(e) 0.2 to 2 percent of a thickening agent.

15. A fiberglass insulation article covered with an aqueous, foamable coating composition according to claim 14 wherein said aqueous, foamable coating composition is being foamed by whipping air into said aqueous foamable coating composition to give an aqueous foam having a liquid to air ratio by volume of 1:1 to 1:20, said aqueous foam being coated upon said fiberglass insulation article and being dried to give a smooth surface coating.

* * * * *